(12) United States Patent
Zink et al.

(10) Patent No.: US 8,782,273 B2
(45) Date of Patent: Jul. 15, 2014

(54) APPARATUS AND METHOD FOR GENERATING A DATA STREAM AND APPARATUS AND METHOD FOR READING A DATA STREAM

(75) Inventors: Alexander Zink, Stegaurauch (DE); Markus Prosch, Erlangen (DE); Olaf Korte, Igensdorf (DE); Christian Kellermann, Nuremberg (DD); Bernd Linz, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/544,453

(22) Filed: Jul. 9, 2012

(65) Prior Publication Data

US 2012/0275541 A1 Nov. 1, 2012

Related U.S. Application Data

(62) Division of application No. 12/526,633, filed as application No. PCT/EP2008/000143 on Jan. 10, 2008.

(30) Foreign Application Priority Data

Feb. 16, 2007 (DE) .......................... 10 2007 007 830

(51) Int. Cl.
*G06F 15/16* (2006.01)
*H04N 7/088* (2006.01)
*H04N 21/435* (2011.01)
*H04N 21/236* (2011.01)
*G06F 17/22* (2006.01)
*G06F 17/27* (2006.01)

(52) U.S. Cl.
CPC ............ *H04N 7/0882* (2013.01); *H04N 7/0884* (2013.01); *H04N 21/435* (2013.01); *H04N 21/23614* (2013.01); *G06F 17/22* (2013.01); *G06F 17/2258* (2013.01); *G06F 17/2705* (2013.01)
USPC .......................................... 709/231; 709/246

(58) Field of Classification Search
CPC . G06F 17/22; G06F 17/2258; G06F 17/2705; H04N 7/0882; H04N 7/0884; H04N 21/435; H04N 21/23614
USPC ......................................... 709/219, 246, 231
See application file for complete search history.

(56) References Cited

U.S. PATENT DOCUMENTS 5,565,927 A * 10/1996 Van Gestel ..................... 348/467
5,627,594 A * 5/1997 van Gestel ..................... 348/468
5,659,368 A * 8/1997 Landis ........................... 348/467

(Continued)

OTHER PUBLICATIONS

Zink et al.; "Apparatus and Method for Genertating a Data Stream and Apparatus and Method for reading a Data Stream"; U.S. Appl. No. 12/526,633, filed Aug. 26, 2009.

*Primary Examiner* — Oleg Survillo
(74) *Attorney, Agent, or Firm* — Keating & Bennett, LLP

(57) ABSTRACT

When generating a data stream, text data, an escape-start-sequence, a first number of data units, an escape-continuation-sequence and a second number of data units are entered into a data stream. A base decoder displays only the text data and skips the data units referenced by the escape-start-sequence and the escape-continuation-sequence, while an extension decoder reads those data units and processes them together.

5 Claims, 7 Drawing Sheets

(56) References Cited

U.S. PATENT DOCUMENTS

| | | | |
|---|---|---|---|
| 5,796,441 A * | 8/1998 | Oshita | 348/476 |
| 5,905,537 A * | 5/1999 | Van Gestel | 348/468 |
| 8,145,498 B2 * | 3/2012 | Herre et al. | 704/500 |
| 2001/0043683 A1 * | 11/2001 | Wilson et al. | 379/88.16 |
| 2003/0149727 A1 * | 8/2003 | Jaschek et al. | 709/206 |
| 2004/0139393 A1 * | 7/2004 | Heuer et al. | 715/513 |
| 2005/0038797 A1 * | 2/2005 | Tabuchi | 707/100 |
| 2005/0075879 A1 * | 4/2005 | Anderton | 704/260 |
| 2005/0225426 A1 * | 10/2005 | Yoon et al. | 340/3.21 |
| 2006/0259971 A1 * | 11/2006 | Yang | 726/24 |
| 2008/0126080 A1 * | 5/2008 | Saldanha et al. | 704/9 |
| 2008/0260048 A1 * | 10/2008 | Oomen et al. | 375/241 |
| 2009/0132476 A1 * | 5/2009 | Claudatos et al. | 707/2 |
| 2010/0135299 A1 * | 6/2010 | Pang et al. | 370/392 |
| 2012/0201514 A1 * | 8/2012 | Kang et al. | 386/244 |

* cited by examiner (base receiver)

(extension receiver)

(exemplary data stream without continuation code)

(Encoding example with continuation code)

APPARATUS AND METHOD FOR GENERATING A DATA STREAM AND APPARATUS AND METHOD FOR READING A DATA STREAM

The present invention relates to data transmission and in particular to an easier data transmission with text for simple receivers and text plus data for more complex receivers, wherein both types of receivers can evaluate the data stream.

BACKGROUND OF THE INVENTION

A

By now, a plurality of individual receiver terminals exist, which can all receive transmitted information in a mobile manner. It is characteristic for this large spectrum that the processing and output capacities of such different information receivers vary strongly. A notebook, for example, has a very high processing and output capacity as a mobile receiver of transmitted information, since a notebook has significant processor resources and memory resources. On the other hand, for example, a mobile phone that also participates in an information service, such as a broadcasting data channel, has only very limited processing resources and output resources. A small mobile broadcasting receiver that is not even intended as a mobile phone but merely as a mobile broadcasting receiver for receiving data, such as soccer league results or other sports results, newspaper headlines, weather news, etc., is even more limited in its processing and output resources if a respective data broadcasting service is used.

Such a text-based information service for digital broadcasting, which is suitable for simple data collection and reuse as well as for very efficient broadcasting transmission, exists under the designation "Journaline". This data service supports a very broad range of receiver types, ranging from cost-effective solutions having a small text display to high-end receivers with graphical user interface and optional text-speech reproduction.

The user can process all information provided by the radio station immediately and interactively. In this respect, the service can be compared to videotext for television. The basic information is provided in a simple text form, wherein, however, at the same time, the option for more complex graphical representations including an extension to multimedia elements such as image or video sequences and other functional extensions is to be enabled.

On the other hand, it is important that a data stream, for example broadcast by a DAB transmitter, is backward compatible, which means that the same can be read and processed equally by simple receivers and by more complex receivers or by base receivers which are simple receivers, and by extension receivers which are more complex receivers.

SUMMARY

According to an embodiment, an apparatus for generating a data stream may have: a means for entering text data into a data stream, for entering an escape-start-sequence into the data stream, wherein the escape-start-sequence defines a first number of data units to be skipped by a base decoder and to be interpreted by an extension decoder, for entering the first number of data units into the data stream, for entering an escape-continuation-sequence into the data stream, wherein the escape-continuation-sequence defines a second number of data units to be skipped by a base decoder and to be interpreted by an extension decoder together with the first number of data units, and for entering the second number of data units into the data stream.

According to another embodiment, an apparatus for reading a data stream having text data, an escape-start-sequence defining a first number of data units, the first number of data units, an escape-continuation-sequence defining a second number of data units, and the second number of data units, may have: a means for displaying text data; and a processor for interpreting the escape-start-sequence such that the first number of data units is determined from the escape-start-sequence for skipping the first number of data units and for interpreting the escape-continuation-sequence such that the second number of data units is determined from the escape-continuation-sequence for skipping the second number of data units.

According to another embodiment, an apparatus for reading a data stream having text data, an escape-start-sequence defining a first number of data units, the first number of data units, an escape-continuation-sequence defining a second number of data units, and the second number of data units, may have: a means for displaying the text data; a processor for interpreting the escape-start-sequence such that the first number of data units is read in, for interpreting the escape-continuation-sequence such that the second number of data units is read in, and for jointly processing the first number of data units and the second number of data units in addition or instead of displaying the text data.

According to another embodiment, a method for generating a data stream may have the steps of: entering text data into a data stream; entering an escape-start-sequence into the data stream, the escape-start-sequence defining a first number of data units that are to be skipped by a base decoder and to be interpreted by an extension decoder, entering the first number of data units into the data stream, entering an escape-continuation-sequence into the data stream, the escape-continuation-sequence defining a second number of data units that are to be skipped by a base decoder and to be interpreted by an extension decoder together with the first number of data units; and entering the second number of data units into the data stream.

According to another embodiment, a method for reading a data stream having text data, an escape-start-sequence defining a first number of data units, the first number of data units, an escape-continuation-sequence defining a second number of data units, and the second number of data units, may have the steps of: displaying text data; interpreting the escape-start-sequence such that the first number of data units is determined from the escape-start-sequence; skipping the first number of data units based on the step of interpreting the escape-start-sequence; interpreting the escape-continuation-sequence such that the second number of data units is determined from the escape-continuation-sequence, skipping the second number of data units based on the step of interpreting the escape-continuation-sequence.

According to another embodiment, a method for reading a data stream having text data, an escape-start-sequence defining a first number of data units, the first number of data units, an escape-continuation-sequence defining a second number of data units, and the second number of data units, may have the steps of: interpreting the escape-start-sequence such that the first number of data units is determined, reading in the first number of data units based on the step of interpreting the escape-start-sequence; interpreting the escape-continuation-sequence such that the second number of data units is determined; reading in the second number of data units based on the step of interpreting the escape-continuation-sequence;

and jointly processing the first number of data units and the second number of data units in addition to or instead of displaying the text data.

Another embodiment may have a computer program with a program code for performing the inventive methods when the computer program runs on a computer.

Another embodiment may have a data stream having text data, an escape-start-sequence defining a first number of data units, the first number of data units, an escape-continuation-sequence defining a second number of data units, and the second number of data units.

Apart from text data, a data stream comprises an escape-start-sequence defining a first number of data units that are to be skipped by a base decoder and to be interpreted by an extension decoder, the first number of data units, an escape-continuation-sequence defining a second number of data units that are again to be skipped by a base decoder and to be interpreted by an extension decoder together with the first number of data units, as well as the second number of data units and finally text data.

In this way, it is ensured that, on the one hand, short start sequences can be used, since the number of data units to which an escape-start-sequence is related is, at the most, as high as or smaller than the maximum number of data units that can be signalized by the escape-start-sequence. For the usually very few cases where the number of data units considered merely for higher-quality decoders is higher than the number of data units interpretable by the escape-start-sequence, further, an escape-continuation-sequence is provided that defines a number of data units that are to be interpreted together with the first number of data units by an extension decoder. Thus, for shorter data blocks with a smaller number of data units, merely the escape-start-sequence is necessitated, which is a short code, since the same is not intended for encoding an arbitrarily long length, but merely a limited length of the data units. Flexibility is obtained in that, on the other hand, arbitrarily long data introductions are possible that can be introduced into the data stream by an arbitrarily frequent repetition of escape-continuation-sequences and second data units after an escape-continuation-sequence.

In other words, due to the flexible data stream the data amount to be introduced into the text for an extension decoder is unlimited. However, this does not affect the length of the escape-start-sequence, since the task of signalizing the length of very long data insertions is actually divided into several sequences, namely into the escape-start-sequence and an escape-continuation-sequence occurring later in the data stream and possibly further escape-start-sequences, while only a very short escape-start-sequence is necessitated for short data insertions occurring relatively frequently. Thus, when the extension decoder finds an escape-continuation-sequence in the data stream, he knows that the data units displayed with this sequence belong to the first data units. With regard to further flexibilization, when using the data stream, a data type indicator is located in the data units which states the type of data and thus the processing to be performed with these data both of the first data units and the second data units. The data type indicator is located, for example, in front of the first data units referenced by the escape-start-sequence, and in front of the second data units referenced by the escape-continuation-sequence.

Other features, elements, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
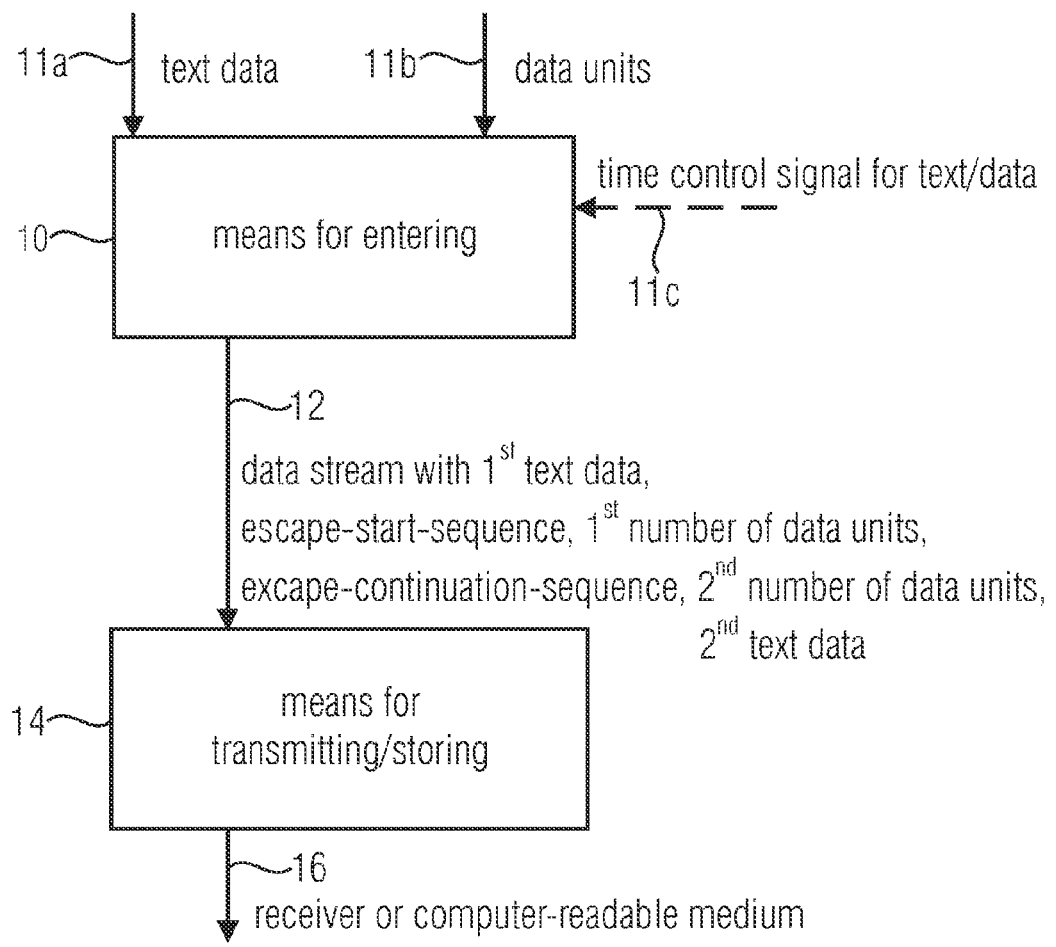
FIG. 1 is a block diagram of an apparatus of a data stream.

FIG. 1 shows an apparatus for generating a data stream comprising a means 10 for entering information into the data stream, which is output at an output 12. The means 10 for entering information into the data stream may be referred to as the inserter. The data stream is fed into a means 14 for transmitting and/or storing the data stream for being transmitted to a receiver or a decoder of the data stream, respectively, via a free space transmission path 16 in the example of a broadcasting transmission. Alternatively, the output 16 of the means 14 for transmitting or storing is connected to a computer-readable memory medium, such as a memory card connected to the output of the means or provided at the other end of a transmission path, such as in a receiver, when this receiver merely stores the data but does not process the same or stores and processes them simultaneously. A computer-readable memory medium can thus be a non-volatile memory card in a receiver or a decoder, or a hard disc of a notebook, or a working memory of a decoder, which retains its data as long as the same is supplied with current or voltage, respectively.

The means 10 for entering includes text data 11a and data units 11b. Advantageously, calculations are made in bytes. Thus, one data unit is 8 bits or 1 byte long. This granularity is advantageous, since both text and data can be easily handled in this granularity. In this context, it is advantageous to use the UT8 encoding format for text encoding, wherein typical ASCII characters are encoded with one byte each, while, for example, German umlauts are encoded with 2 bytes and, for example, Chinese characters are encoded with 3, 4 or more bytes. It follows that a base receiver is able to decode an UTF8 encoding, which can be performed, for example, by depositing an UTF8 decoding table. Depending on the decoding, the means for entering obtains text data and data units in parallel. In this case, the means for entering also receives a time control signal 11c, which determines at what time text data and at what time data units are to be fed, for example, into the serial data stream 12. Alternatively, the means 10 for entering can already receive text data and data units via a single input, which already provides text data and data units in the correct desired temporal or bit stream order.

Figure 3A:
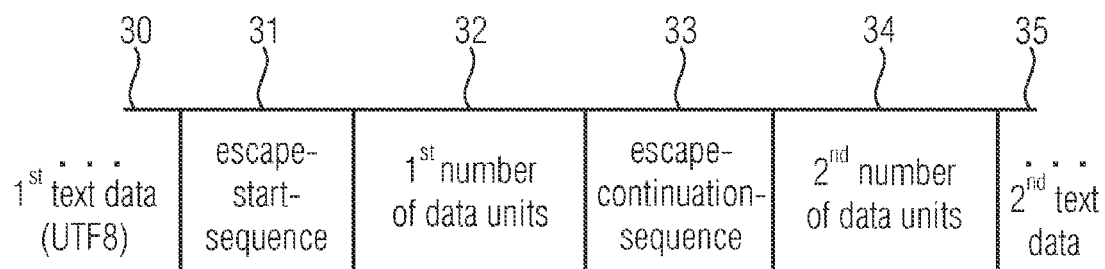
FIG. 3a is an illustration of a data stream.

The means for entering is implemented to enter text data into the data stream. When data units to be skipped by a simple decoder are to be entered, while the data units are to be read or processed by a more complex decoder, an escape-start-sequence is entered in the data stream such as is indicated, for example, in FIG. 3a. The escape-start-sequence 31 defines a first number of data units to be skipped by a base decoder and to be interpreted by an extension decoder. This first number of data units is then also entered in the data stream, as can be seen in FIG. 3a at 32. If the data block to be entered includes more data units than are to be defined by the escape-start-sequence, the means 10 will enter an escape-continuation-sequence 33 defining a second number of data units to be skipped by a base decoder, but, however, to be interpreted by an extension decoder together with the first number of data units. This second number of data units is then also entered in the data stream, as can be seen in FIG. 3a at 34.

Depending on the implementation, i.e. when the data block is a large data block that has even more data than can be defined by the escape-continuation-sequence, a further escape-continuation-sequence is written into the data stream, etc., until all the data units to be entered at this position into the text data that are to be interpreted together by an extension decoder have been entered.

Then, the means 10 for the entering of FIG. 1 will typically enter text data again, that are indicated in FIG. 3a, for example, as second text data 35, such that a data stream results wherein first text data 30 and second text data 35 are present, that, in a way, enclose data to be skipped by the base decoder, wherein the base decoder is at least able to read the escape-start-sequence and particularly the number of data units as well as the escape-continuation-sequence and at least the number of included data units in order to be able to skip the correct number of data units in the data stream.

Figure 3B:
FIG. 3b is an enlarged illustration of an escape-start-sequence and an escape-continuation-sequence according to one aspect.

FIG. 3b shows an example of an escape-start-sequence 31 comprising an escape start code 31a as well as a downstream length code 31b. The escape-continuation-sequence 33 is built analogously, comprising a separate continuation code 33a and a downstream length code 33b. For example, all codes 31a, 31b, 33a, 33b are each 1 byte or, respectively, one data unit long, which has the effect that 256 data units can be coded by the length code. This means that, when a data block is more than 256 data units long, the continuation code 33a is to be written or entered into the data stream after the first 256 data units in order to encode the remaining data units of the data block with the subsequent length code 33b.

If a data unit were respectively longer, a length code that is one data unit long could encode a larger number of data units, which would have the effect that in such a data stream the overall number of continuation codes becomes smaller. If, however, the length code of less than 8 bits is selected, the maximum number of data that can be encoded by the length code is respectively smaller, so that with otherwise the same circumstances the number of continuation codes in the data stream will increase correspondingly. Typically, an optimum exists in that a certain length of the data units exists for a certain average length of the data blocks. If the length code were made too long, this procedure would be inefficient, since then the whole long length code would have to be written into the data stream, even for only a very short data insertion. If, on the other hand, the length code were made too short, a continuation code would be written for the very large number of data blocks, which would not be necessitated in particular in the implementation shown in FIG. 3b if a longer length code had been used right from the beginning.

Figure 4A:
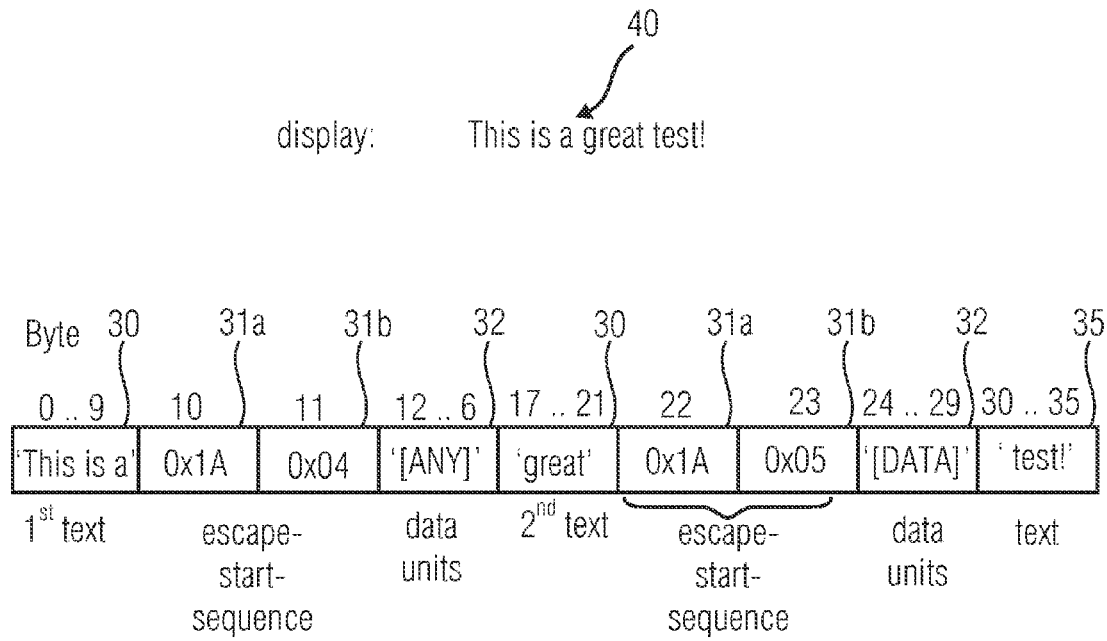
FIG. 4a is an example data stream without continuation code.

FIG. 4a shows an exemplary data stream resulting in a display "This is a great test!", as indicated at 40 in FIG. 4a.

The associated data stream has initially first text data 30 with the text "This is a ". This necessitates 10 bytes, since one byte each is necessitated for every letter and for the blank spaces in the UT8 encoding. Thus, the first text data are 10 bytes long.

Then, data are to be inserted. For signalizing this, the escape start code 31a, which is 1A in the example shown in FIG. 4a, can be found in the byte index (zero-based) 10, wherein the prefix "0x" indicates a hexadecimal representation. Of course, any other code that differs from the text code could be inserted for the escape start code. In other words, the escape start code 31a, which is 1 byte long in the example in FIG. 4a, is to differ from the code that defines characters (numbers, letters, . . . ) displayable on the screen in a UT8 encoding. Thus, the escape codes are, for example, UT8 control characters or other fixed characters that differ from the text codes for characters displayable on the screen.

Subsequent to the escape start code 31a is a length code 31b, which indicates how long the data field following the length code 31b is. The length field includes the code 4, so that, consequently, the first data units 32 in FIG. 4a comprise 5 bytes. The background for this is that the length field implicitly includes the term "−1", since a length of zero would not make sense.

Then, another text field follows, namely the word "great" with 5 bytes, whereupon again, at byte index 22, an escape start code 31a is written, followed by a length code 31b having a value of 5, since then 6-byte data are written in the byte indices 24 to 29 following the length code. On the output side, another text block 35 is present, which is 6 bytes long, since 1 byte is necessitated for every letter of "test" and since 1 byte is also necessitated for the exclamation mark.

This results in a 36-byte long data stream including 11 bytes of inserted additional data at two different positions.

A base decoder will read in and represent the data and will then, when he encounters the escape start code 31a, interpret the same to the effect that he will search for a length code associated to the escape start code. Then, an interpretation of this length code will cause the base decoder to skip the data units referenced by the escape start code and the length code, i.e. to ignore the same and to consider them not any further. Then, the base decoder will read in the text data in the byte indices 17 to 21 to then recognize again a code 31a as an escape start code and to search for an associated length indication in the code 31b, in order to skip again the number of bytes signalized in the code 31b.

Thus, it is ensured in a simple manner that a base decoder can even read a data stream written for newer or more complex extension decoders. The fact that the base decoder is not able to deal with the data but can correctly interpret the escape-start-sequence with the code and length indication ensures the backward compatibility.

However, an extension decoder is not only able to interpret the start sequence, i.e. the codes 31a and 31b, but also not to just skip the data but to process the same in order to be able to perform, apart from simple text display, additional functions that can be controlled via the data stream and the data associated to an escape sequence.

Figure 4B:
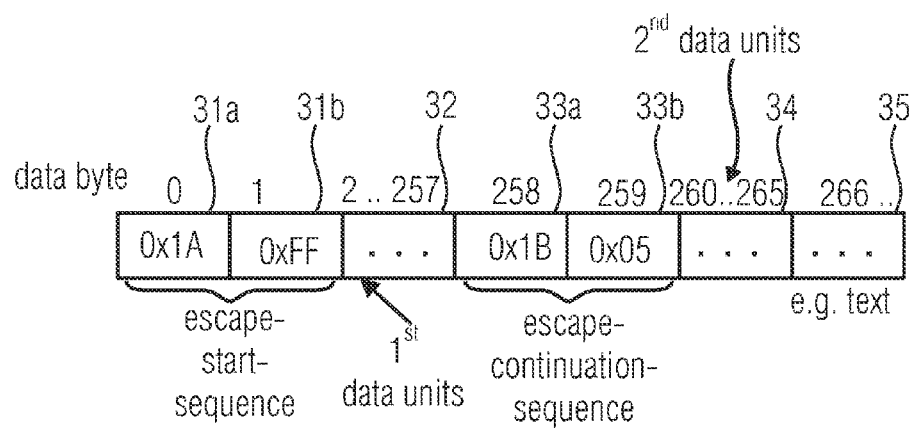
FIG. 4b is an encoding example with continuation code.

FIG. 4b shows an encoding example with continuation code, wherein it is assumed in the example shown in FIG. 4b that one data block is longer than 256 bytes. If such a large data block is to be inserted, first, an escape-start-sequence, which again consists of an escape start code 31a and a downstream length code 31b, is inserted at the data byte index 0. However, now, the length value in the length code 31b is not any number as in the byte index 11 or the byte index 23, but the maximum, namely "FF". Then, following the length code 31b, the 256 first data units 32 are written into the data stream in the byte indices 2 to 257. Since several further data units are present, namely 262 bytes all in all, the data stream generator will determine that it has not yet written all data units into the data stream. Consequently, the same writes a continuation code 33a into the data stream, which will differ from the escape start code 31a, so that the decoder knows that the data units belonging to the continuation code, which, for example, immediately follow the continuation code, still belong to the data units that have been processed or fed in prior to the continuation code. In the example shown in FIG. 4b, six more data units have to be entered so that the length code 33b following the continuation code signalizes a length of 6 (code 0x05). Then, following this length code, the insertion into the data stream is terminated with writing the second data units 34, wherein then, starting from the byte index 266 shown in FIG. 4b, e.g. normal text 35 can follow.

It should be noted that, depending on the implementation, the escape continuation code 33a does not necessarily have to differ from the escape start code 31a. This is not important for the base decoder. The same merely has to interpret both the escape start code 31a and the escape continuation code 33a and to read the downstream length code following this interpretation, in order to know how many data are to be skipped. In this case, an extension decoder would be implemented such that the same assumes automatically, when an escape start code, followed by a length code with a maximum length, i.e., for example, FF, occurs for the first time, that the subsequent data units still belong to the data units 32 and thus have to be processed together. The meaning of the escape start code would thus be "switched" in that the length code 31b following the escape start code 31a indicates a maximum length. When the escape start code 31a and the continuation code 33a have the same value, the decoder would, when the length code 31b after the first escape start code 31a does not have the maximum values, i.e. FF, interpret the continuation code following the data units not as a continuation code but as a new start code, so that the data following the second start code are not considered as a continuation of the data following the first start code but as new data of a new data block that can be processed differently. The interpretation whether data are continuation data or no continuation data is of particular importance when a data type indicator is located in every data block consisting of several data units at a certain position, such as at the beginning, which is read when the data are no continuation data, or, when the data are continuation data, is not expected by a decoder and also not read out, as will be discussed below with reference to FIG. 3c.

In the following, with reference to FIG. 5, an exemplary sequence of steps for generating a data stream is illustrated, as it can be performed by a data stream generator, which is structured as shown in FIG. 1.

Figure 5:
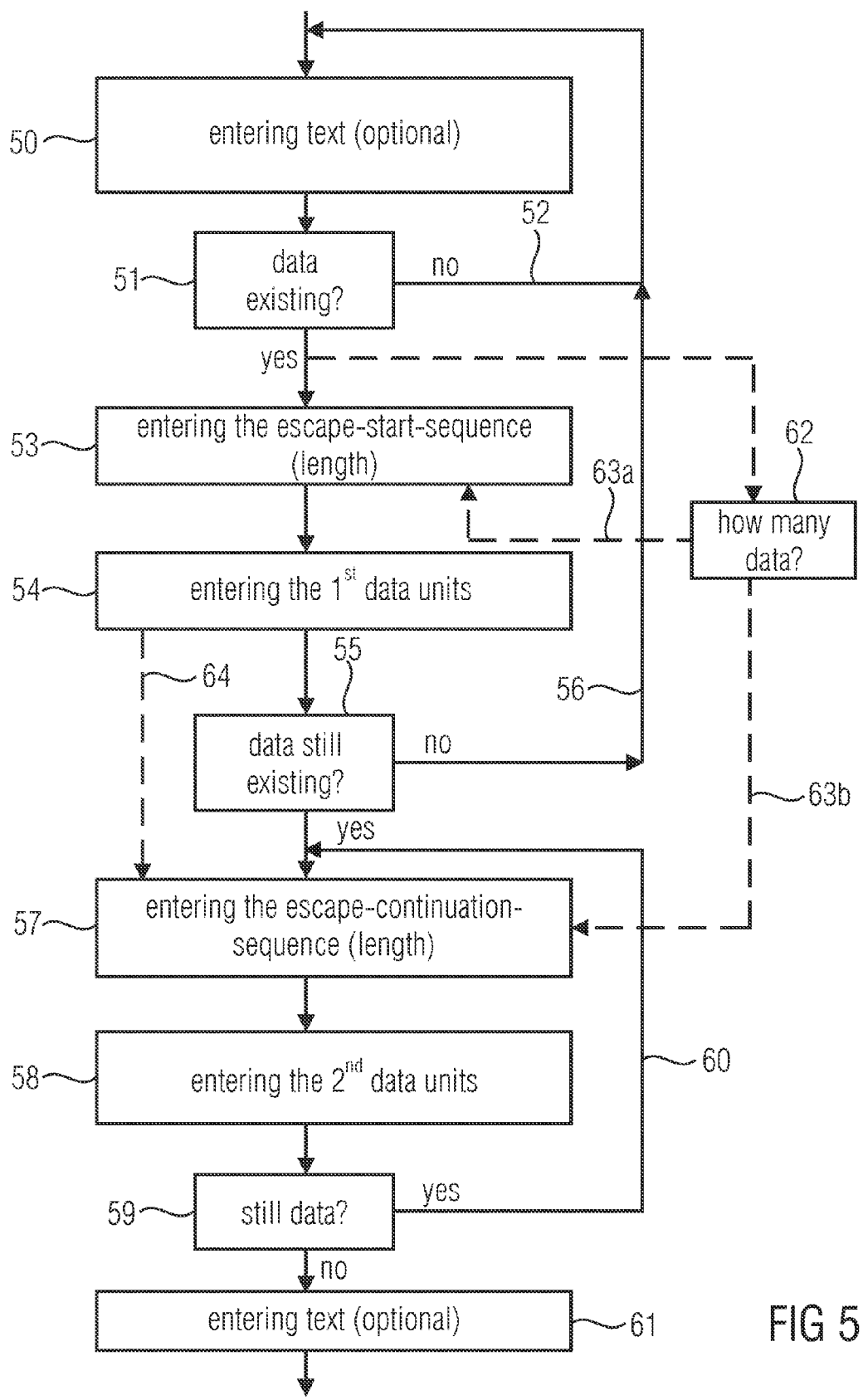
FIG. 5 is a flow diagram of a method for generating a data stream.

The flow diagram in FIG. 5 begins with a step of entering text 50. In a step 51, it is checked whether, after entering text, data exist which still have to be entered. If the answer to this question is no, the next text object is entered into the data stream, as illustrated by loop 52. If, however, the answer to the question is yes, the means 10 for entering enters an escape-start-sequence, as is illustrated in step 53. The escape-start-sequence includes information about the length of the data, i.e. the number of data units. After entering the escape-start-sequence into the data stream, the first data units are entered, as indicated at 54. In a step 55, it is checked whether all data belonging to a data block are entered in the data stream. If the answer to this question is no, i.e. no more data exist, a text object or an escape code will be entered again, as is illustrated by a loop 56.

It should be noted here that the escape-start-sequences could stand in front of a text, after a text or in between a text. Alternatively, however, an escape-start-sequence can also be in front of or after another escape sequence, wherein another escape sequence can indicate things other than specific data.

If, however, it is determined that data still exist, an escape-continuation-sequence is entered, as shown in step 57. In this escape-continuation-sequence, also the length of the data units is determined which will then be entered in a step 58. In a step 59, it is checked whether further data are present. If this is the case, i.e. further data of the data block are entered, a further escape-continuation-sequence is written, as shown at 60. If, on the other hand, all data are entered, text is again entered basically in the same manner as shown at step 50. For purposes of clarity, this entering of text after a data block is indicated by step 61 in FIG. 5.

It should be noted that the check in step 55 as to whether data are still present or in the step 59 as to whether data are still present is not to be performed necessarily when the length of the data to be entered is determined in parallel or in a separate process, as shown in FIG. 5 at block 62. In block 62, it is determined how long a data block to be inserted is. Based on the number of data units to be maximally encoded in the escape-start-sequence, block 52 knows immediately how many continuation sequences are necessitated. In the embodiment shown in FIG. 4b, block 62 determines that the maximum length is to be entered into the escape-start-sequence, and that then a continuation sequence is entered whose length is also determined, as indicated by the control arrows 63a and 63b in FIG. 5. In this case, the check in block 55 or block 59 is not to be performed, as indicated by a dotted connecting arrow 64. This alternative already represents a solution where the escape-start-sequence is already finished prior to entering the data units, while, in the second alternative, the length is only to be entered into the escape-start-sequence after the first data units or the second data units, respectively, have been entered.

In the following, with reference to FIG. 2a and FIG. 2b, receivers for receiving or decoding the data stream will be discussed, wherein this data stream can be structured basically as shown in FIG. 3a, to the effect that the same includes text data, an escape-start-sequence, a number of data units, then an escape-continuation-sequence and following the escape-continuation-sequence again a number of data units which can be followed by text data, or by a further escape-continuation-sequence.

The base receiver for reading the data stream comprises an input interface 70 for obtaining the data stream 16. The data stream is then transmitted to a processor 71, which is coupled to a text display 72 for reading the text from the data stream and displaying the same, wherein the processor determines the length or the number of data units when the same encounters an escape-start-sequence, for skipping this number of data units, and wherein the processor further, when the same encounters an escape-continuation-sequence, also skips the number of data units belonging to the continuation sequence, as is shown in block 71 of FIG. 2a.

Figure 2A:
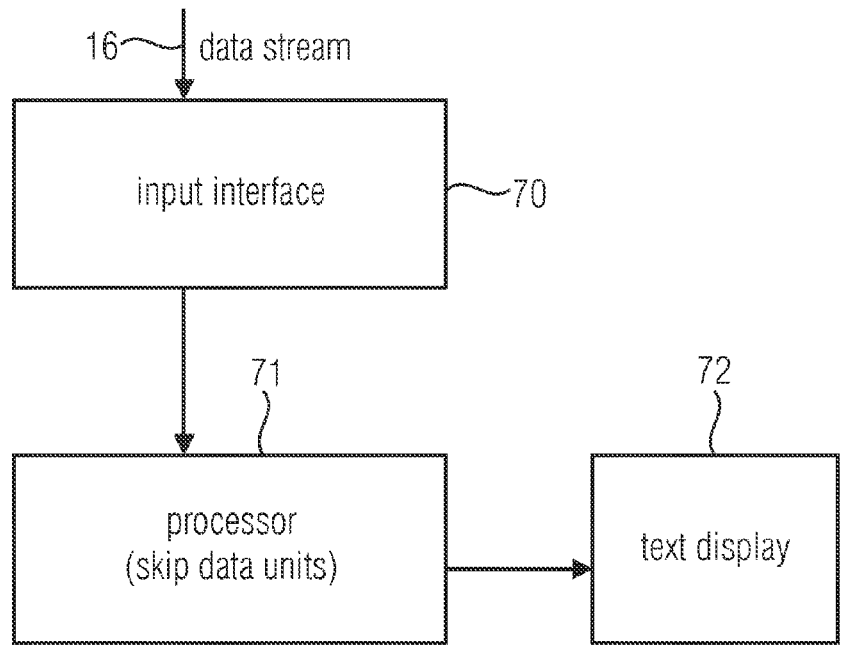
FIG. 2a is a block diagram of a base receiver.
Figure 2B:
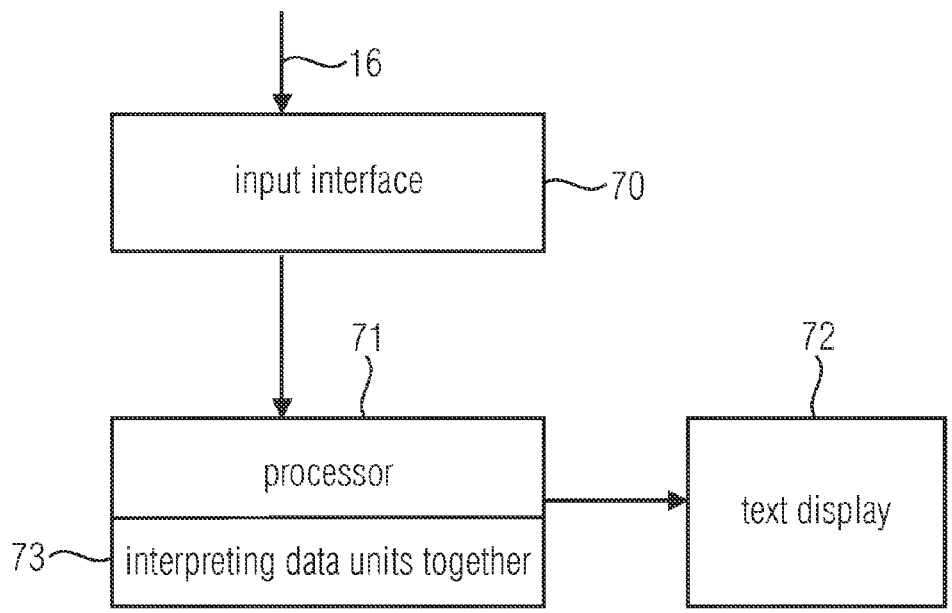
FIG. 2b is a block diagram of an extension receiver.

An extension receiver as shown in FIG. 2b comprises, in addition to the elements of the base receiver of FIG. 2a, a module or a functionality of the processor 71 that the data units are not simply skipped but are executed together.

In addition to the text display 72, that can or will function in the same manner in the extension receiver as in the base receiver, the extension receiver will perform an interpretation of the data units after the escape-start-sequence and the escape-continuation-sequence.

In the following, with reference to FIG. 6A and FIG. 6B, a comparison of the functionalities of a base receiver without data processing option and an extension receiver with data processing option is made.

Figures 6A, 6B:
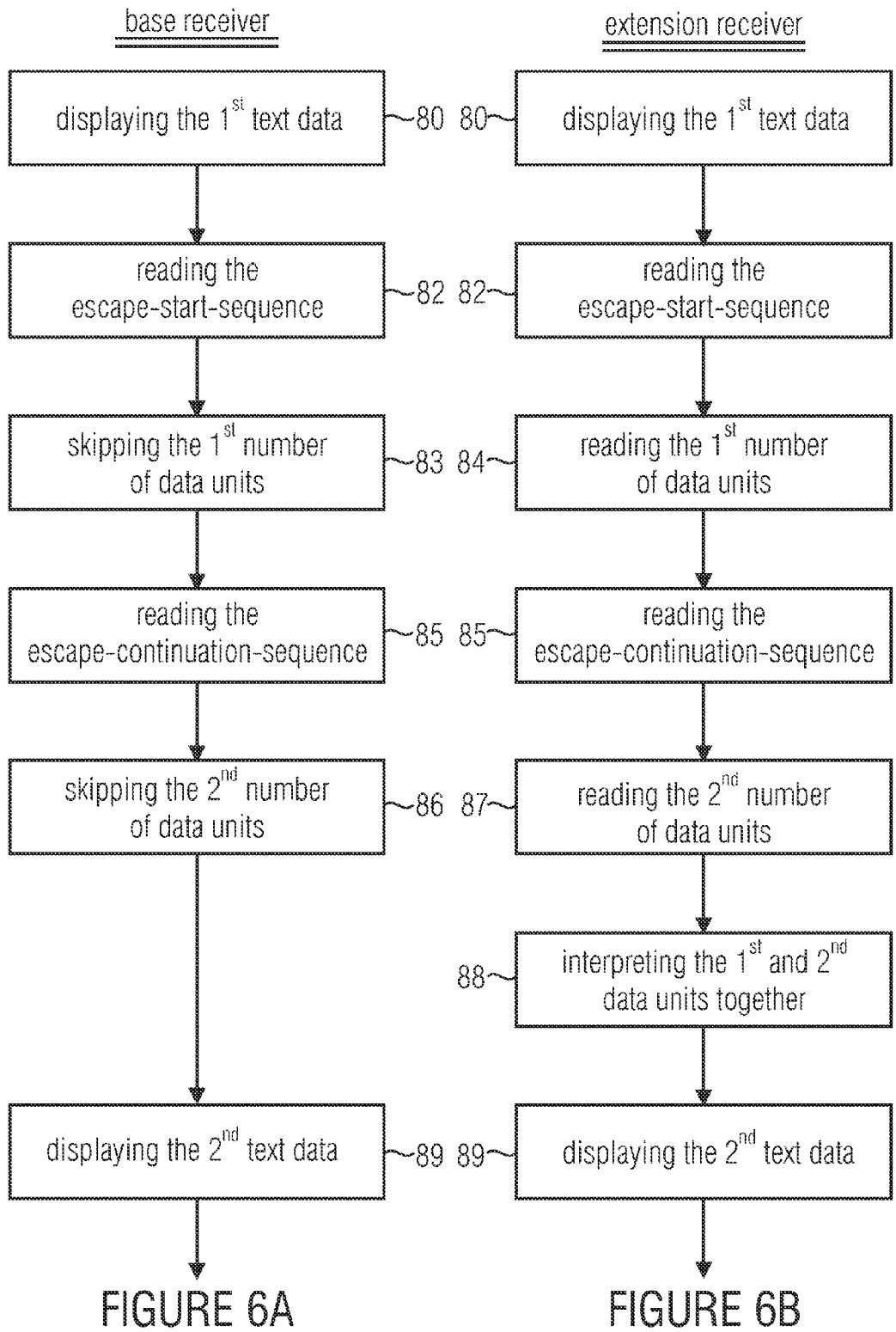
FIG. 6A is a flow diagram executed by a base receiver.
FIG. 6B is a flow diagram executed by an extension receiver.

When both the base receiver and the extension receiver read text data, the processor 71 of FIG. 2a or FIG. 2b will process the text data, decode the same and then provide them to the text display 72 and display them, as is shown in the step 80 of FIG. 6A and FIG. 6B. If the receivers encounter an escape-start-sequence, this escape-start-sequence will be read, as illustrated in a step 82. In particular, the base receiver will see in step 82 how many data units are indicated by the escape-start-sequence, i.e., for example, by the length code 31b or FIG. 3b. In a step 83, the base receiver will then skip the number of data units that it has determined in step 82. In contrast, in a step 84, the extension receiver will not skip the data units following the escape-start-sequence but read the same. Therefore, the extension receiver also necessitates the length information. If the data were, however, encoded in a different manner than text, the length information would not necessarily be necessitated.

In a step 85, both the base receiver and the extension receiver read the escape-continuation-sequence following the first data units 32 of FIG. 3a. Here, the base receiver is mainly interested in the length code in order to find out how many data are to be skipped, which is then performed by the base receiver in a step 86. On the other hand, the extension receiver will not skip the second number of data units in a step 87, but read the same, as is illustrated at 87. Then, in a step 88, for which there is no parallel base receiver, the extension receiver will activate the functionality or the module 73 of FIG. 2b, and achieve a common execution of the first and second data units. When all data units have been processed, both the base receiver and the extension receiver will display the second text data in a step 89, i.e. the data 35 following the data stream shown in FIG. 3a. If, however, the second length code 33b also has the maximum length, i.e. in this example "FF", the extension receiver can read in a further escape continuation code, interpret the subsequent length code and then also add those referenced data units to the first and second data units in order to again allow a common execution.

Figure 3C:
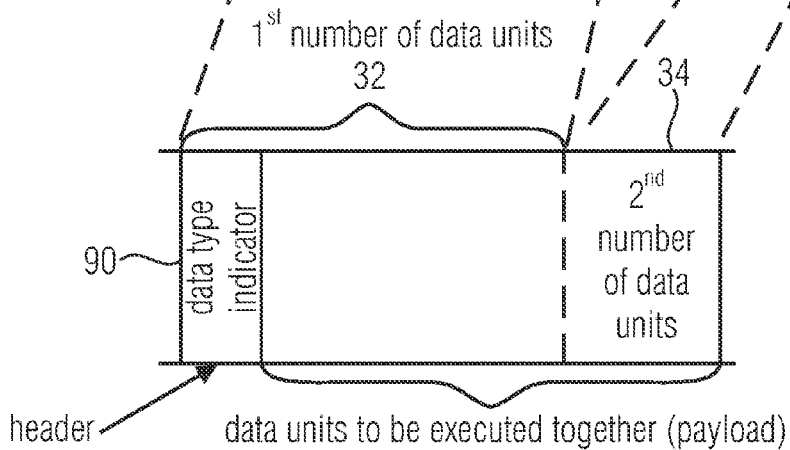
FIG. 3c is an illustration of the data referenced by the escape-start-sequence and the escape-continuation-sequence of FIG. 3a or FIG. 3b, together with a data type indicator interpretable by an extension decoder.

Subsequently, with reference to FIG. 3c, it will be discussed in more detail what the extension receiver performs in step 88, or how the data are interpreted that have been extracted after the escape start code and the continuation code.

In one example, the first number of data units comprises a data type indicator 90, which is, for example, 1 byte long. This data type indicator 90 can be found only in a certain, for example the first byte of the first number of data units, which is referenced by an escape-start-sequence 31. In comparison, no such data type indicator is present in the second number of data units, but the second number of data units 34 fully contributes to the data units to be executed together, or the so-called "payload". When a data type indicator 90 is used, an extension decoder will interpret the data included after the continuation code as belonging to the same type as the data that are included in the first number of data units. This enables the fact that no signalizations are necessitated for the second number of data units following the continuation code in the data stream, which include information about whether these are continuation data or which data type the second number of data units has. Instead, the data type indicator in the first number of data units is simply also used or applied for the second number of data units, or the data in the second number of data units are simply added to the first number of data units, respectively, as if there had never been a separation, so that they will then be executed or processed together.

It is an advantage of the inventive scalable data stream that the same is based on general standards. Thus, objects can be imported and further processed in XML format.

The data stream is particularly suitable for digital broadcasting systems, as an additional data channel providing an additional value for the listeners, since they now have immediate access to text information wherever they are, wherein receivers for digital broadcasting are either simple receivers displaying at least text information, or particularly complex and thus, of course, more cost-intensive receivers that can perform any data processing of the first number of data units and the second number of data units. It follows that receivers having a text display that are both inexpensive and thus available as a mass product can generate an additional value for the listener. However, the data stream is also suitable for high-end receivers with a graphical user interface and an optional speech reproduction. All this is obtained by simple implementations, even in inexpensive receivers and by a particularly simple method of utilization where the user does not have to take care of which data are currently valid. Instead, deleting the data or executing the data, depending on which receiver a user has, is performed fully automatically without the user having to take care of it.

Further, in certain examples, the text data are illustrated in an object-oriented manner, wherein these objects are all independent and self-contained units. Thus, no global data structures have to be assembled or maintained in the receiver. Objects are transmitted in the form of a data carousel, and data caching is advantageously used in the receiver. Text data that can, for example, be menu designs, news articles or ticker news are transmitted as so-called NML objects, wherein NML means News Service Mark Language and is similar to XML-based binary encoded content representations.

Figure 7:
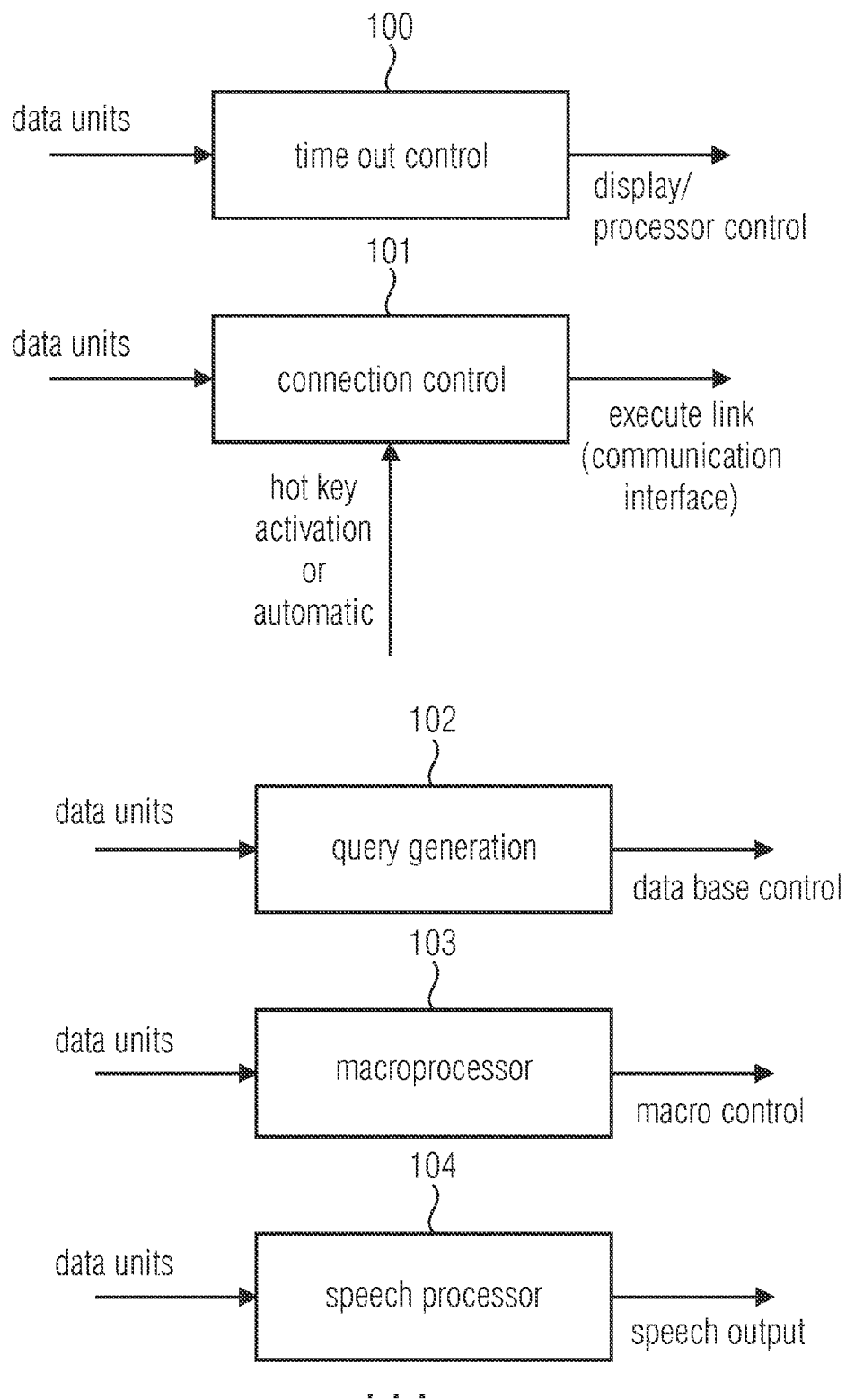
FIG. 7 are different data types as can be indicated by a data type indicator and as can be processed.

The hexadecimal code 1A is used as start-escape-code 31a, and the hexadecimal code 1B is, for example, used as continuation code. The data type indicator 90 of FIG. 3c can indicate several data types, as will be illustrated below. The following data type indicator values are merely exemplary. An indicator of "00" indicates padding. The included data carry padding bytes, wherein this content is ignored both by the extension decoder and the base decoder. An alternative type of data set has an indicator "01" and represents an absolute timeout. The absolute presentation timeout period of an NML object is defined. When this timeout has passed, the NML object will no longer be displayed. This escape-sequence-code representation is necessitated for marking individual NML objects. A general timeout for the whole service is alternatively illustrated. The payload after the data type indicator includes the number of 15 minutes since Jan. 1, 2000, as a 24-bit integer number without signs, which covers more than 450 years. A data type indicator of the type "02" indicates a relative timeout. Here, the relative presentation timeout period of an NML object is defined. When this period has passed, the NML object is no longer displayed. The timeout begins with every reception of an NML object, even when the object is already stored in the cache. This escape-sequence-code serves for marking individual NML objects. The payload data include the number of minutes as a 16-bit integer number without signs (unsigned), which covers more than 45 days. Generally, the timeout data are processed by the timeout control 100 of FIG. 7.

The data type indicator "03" relates to a general link target. A general link target is a target that is presented or activated, for example, by the connection control 101, when the user explicitly demands the execution of an action, i.e. when a "hot button" functionality is illustrated or provided, respectively, for user interaction. General link targets can be defined for all types of NML objects. The availability of a general link target for a currently displayed NML object is communicated to the user in some manner or other when he has an extension receiver. The payload data that are shown, for example, in FIG. 3c have the following format. 1 byte represents a connection type and n bytes represent a link address. The following link-type values, for example, are available. When the link type has a value, for example of "00", the subsequent 2 bytes are an object ID of another NML object in the same data service.

Another link-type byte, for example of "01", followed by a URI string, points to different DAB/DRM multiplexes, services or service elements.

Another connection type, such as "02" showing a URL string, points to an Internet address or a document.

Another link type, such as "03" followed by a telephone number, points to a voice service that can be reached by telephone. The number starts here, for example, with an international prefix, for example "+[international country code]".

Generally, an extension receiver is designed to ignore unknown link-type values.

A further data type indicator "FF" is considered, for example, as a proprietary data type indicator, preceding data concerning only certain extension receivers that can evaluate these proprietary data.

Contrary to the above object management types, the data units can also include content management types. A data type indicator of "20", also referred to as keyword, marks a following keyword together with an optional keyword description. The keyword can be used, for example, for generating a receiver-based search index, as shown by the query generation means 102 in FIG. 7. The payload data section has the following format. First comes a length code having the keyword length, wherein the value equal to the length −1 is indicated as unsigned integer number. The number of visual text characters following this data section that should be treated as a keyword is identified. Then, a description with n bytes follows, wherein the optional description can be indexed in addition to the keyword and/or can be displayed for the user.

Another data type indicator, for example of "21", represents a macro definition. A macro allows the definition of text sections including optional escape sequences that can be inserted several times anywhere in the content section with a simple reference. For example, the macro can define speech descriptions that are to be illustrated in addition to textual text elements. The data section has a format where initially a macro ID (0 to 255) of one byte identifies the following macro definitions. Then a macro definition with n bytes follows. The text (including escape sequences), that is to be inserted when this macro is referenced by its ID, is included in the macro definition with n bytes. It should be noted that the macros are not necessarily to be used for essential information, since receivers can also ignore the same. Another data type indicator "22" stands, for example, for a macro reference. The macro definition referenced by its ID is virtually introduced at this position of the escape sequence for displaying to the user. The data section includes a 1-byte macro ID (0 to 255) referencing a macro definition. Macros are generally processed by the macro processor 103 in FIG. 7.

Another group of data types can comprise speech support types. A data type indicator of, for example "A0", defines a standard language or a preset language. Here, the preset language of the NML object is described or referenced, respectively. The data section, i.e. the payload of FIG. 3c, carries a 3-letter ISO language code of small letters.

Another speech support type, for example referenced by "A1" is the language section. The same defines the language of a specified number of a text section or a specific part of an NML object. The payload section has the following format. A text length having one byte is present, whose value equals the value of the number of data units of this text length −1, as unsigned integer number. This identifies the number of visual text characters that follow this data section for which the language definition applies. Then, a group of 3 bytes follows with a language definition, which carries a 3-letter ISO language code of small letters.

Another language support type is indexed, for example, by the data type indicator "A2". It relates to speech phonemes and defines a phoneme description of a text section using the international phonetic alphabet (IPA). The payload section has a format having first a text length with one byte whose value is an integer number. This byte identifies the number of visual text characters following this data section, which are to be represented by a phonetic definition. Then a group of n bytes with IPA phonemes follows. This group includes the phoneme definitions of the phonemes as IPA notations.

Another speech support type, for example referenced by the data type indicator "A3", comprises a speech break, which defines a break for text-to-speech processors that is to be inserted at the position of the escape sequence. The data section carries 1 byte as an unsigned integer number, wherein this byte defines a speech period in units of 0.1 seconds.

Another speech support type that can, for example, have the data type indicator "A4" defines characters and particularly a number of visual text characters following the escape sequence that are to be treated as individual characters or numbers instead of continuous words or numbers by the text-to-speech processor. The payload section carries 1 byte defining the number of visual text characters as unsigned integer number having a respective value.

It should be noted that all these data types, depending on the maximum number that can be represented by the length code, can either be represented in the first number of data units 32 of FIG. 3a or, when the number of data units is not sufficient for writing all the data, are included in the second number of data units that can each be started with an escape-continuation-sequence. It follows that not necessarily all data types that are referenced by a data type indicator need to have data units both after an escape-start-sequence and an escape-continuation-sequence. Instead, even short data types can include merely data necessitating no continuation since the number of data units of these data is smaller than the maximum number of data units representable by the length code 31b.

Depending on the circumstances, every inventive method can be implemented in hardware or in software. The implementation can be performed on a digital memory medium, in particular a disc or CD with electronically readable control signals that can cooperate with a programmable computer system such that the method is performed. Thus, generally, the invention also consists of a computer program product with a program code stored on a machine-readable carrier for performing an inventive method when the computer program product runs on a computer. In other words, the invention can be realized as a computer program with a program code for performing the method when the computer program runs on a computer.

According to an embodiment of the apparatus for generating, the data stream is a serial data stream and the means 10 for entering is implemented to enter the escape-start-sequence 31 in the data stream after or in front of the text data 30 and to enter the escape-continuation-sequence 33 after the first number 32 of data units into the data stream.

In a preferred embodiment of the apparatus for generating, the means 10 for entering is implemented to place first the text data 30, then the escape-start-sequence 31, then the first number of data units, then the escape-continuation-sequence 33 and then the second number 34 of data units into the data stream.

In a preferred embodiment of the apparatus for generating, the length code 31b is entered into the data stream immediately after the escape start code 31a, or the length code 33b is entered into the data stream immediately after the continuation code 33a.

In a preferred embodiment of the apparatus for generating, the length code 33b entered into the data stream after the continuation code 33a and the length code 31b entered into the data stream after the escape start code 31a originate from the same encoding table for length encoding.

In a preferred embodiment of the apparatus for generating, the data units in the data stream are equal and comprise a predefined plurality of bits each.

In a preferred embodiment of the apparatus for generating, the predefined plurality of bits equals 8, such that one data unit is 1 byte.

In a preferred embodiment of the apparatus for generating, the data stream is to be readable by a first type of base receivers and by a second type of extension receivers, wherein the means 10 for entering is implemented to use text data codes that can be detected by the base receivers and the extension receivers.

In a preferred embodiment of the apparatus for generating, the escape start code 31a has the same length as a continuation code 33a within an escape-continuation-sequence 33, wherein this length is equal to the length of one data unit.

In a preferred embodiment of the apparatus for generating, the length code is implemented to encode a content length of 1 to 256 bytes.

In a preferred embodiment of the apparatus for generating, the data type indicator 90 is such that the same does not have to be interpretable by a base decoder, but is interpretable by an extension decoder.

In a preferred embodiment of the apparatus for generating, the means 10 for entering is implemented to enter, following the data type indicator, data having the data type indicated by the data type indicator 90.

In a preferred embodiment of the apparatus for generating, the means 10 for entering is implemented to enter the data type indicator 90 into the data stream in the first number of data units 32 immediately after a length code 31b of the escape-start-sequence 31.

In a preferred embodiment of the apparatus for reading, the data stream is latched in a buffer and the processor 71 is implemented to delete the first number of data units 32 and the second number of data units 34 from the buffer and to continually read out the buffer, or to control the buffer such that an area of the buffer where the first number of data units 32 and the second number of data units 34 are stored is skipped when reading out the buffer.

In a preferred embodiment of the apparatus for reading, the first number 32 of data units comprises a data type indicator 90 for indicating a data type of the first number of data units 32 and the second number of data units 34, and the processor 71 is implemented to read out the data type indicator 90 and to process the first number of data units 32 and the second number of data units 34 together according to the data type indicator 90.

In a preferred embodiment of the apparatus for reading, the target is an object with text data in the data stream, a DAB/DRM multiplex, a service or service element, an Internet address, a document on the Internet or a telephone number.

In a preferred embodiment of the apparatus for reading, the processor 71 is implemented to ignore the first data units 32 or the second data units 34 when the same define a non-interpretable target.

In a preferred embodiment of the apparatus for reading, the first number of data units 32, the second number of data units 34 or further data units have a data type indicator 90 comprising speech support data for a speech processor 73, that indicate a language of a text section, comprise speech phonemes, are related to a speech break or have speech characters, and the processor 71 is implemented to output speech support data and to supply the same to the speech processor for generating or influencing a speech output.

In a preferred embodiment, the data stream is stored on a computer-readable medium.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for generating a data stream, comprising:
   entering first text into the data stream;
   entering an escape-start-sequence into the data stream, the escape-start-sequence defining a first set of data units that are to be skipped by a base decoder but to be interpreted by an extension decoder,
   entering the first set of data units into the data stream,
   entering an escape-continuation-sequence into the data stream, the escape-continuation-sequence defining a second set of data units that are to be skipped by the base decoder but to be interpreted by the extension decoder together with the first set of data units;
   entering the second set of data units into the data stream; and
   entering second text following the second set of data units; wherein
   the escape-start-sequence includes an escape-start code signaling a beginning of the escape-start-sequence and a first length code identifying a first number of data units of the first set of data units,
   the escape-continuation-sequence includes a continuation code signaling a beginning of the escape-continuation-sequence and a second length code identifying a second number of data units of the second number of data units,
   the escape-start code is different from the continuation code, or, alternatively, the escape-start code and the continuation code are identical and the first length code includes a maximum length signal,
   when the first length code includes the maximum length signal, a code following the first length code including the maximum length signal in the data stream is the continuation code of the escape-continuation-sequence;
   the first set of data units and the second set of data units are mutually exclusive; and
   at least one of entering the first text, entering the escape-start-sequence, entering the first set of data units, entering the escape-continuation-sequence, entering the second set of data units, and entering the second text is performed by an inserter, the inserter comprising a hardware implementation.

2. An apparatus for generating a data stream, comprising:
an inserter implemented in hardware and configured to enter first text into the data stream, configured to enter an escape-start-sequence into the data stream, wherein the escape-start-sequence defines a first set of data units to be skipped by a base decoder but to be interpreted by an extension decoder, configured to enter the first set of data units into the data stream, configured to enter an escape-continuation-sequence into the data stream, wherein the escape-continuation-sequence defines a second set of data units to be skipped by the base decoder but to be interpreted by the extension decoder together with the first set of data units, configured to enter the second set of data units into the data stream, and second text following the second set of data units; wherein the escape-start-sequence includes an escape-start code signaling a beginning of the escape-start-sequence and a first length code identifying a first number of data units of the first set of data units, the escape-continuation-sequence includes a continuation code signaling a beginning of the escape-continuation-sequence and a second length code identifying a second number of data units of the second set of data units, the escape-start code is different from the continuation code, or, alternatively, the escape-start code and the continuation code are identical and the first length code includes a maximum length signal, when the first length code includes the maximum length signal, a code following the first length code including the maximum length signal in the data stream is the continuation code of the escape-continuation-sequence; and the first set of data units and the second set of data units are mutually exclusive.

3. The apparatus according to claim 2, wherein the escape-start code or the continuation code differ from text codes.

4. The apparatus according to claim 2, wherein the inserter is implemented and configured to enter, in a predetermined relation to the escape-start-sequence, a data type indicator indicating a data type of both the first set of data units and the second set of data units into the data stream.

5. A non-transitory computer-readable medium having a computer program with a program code for performing, when the computer program runs on a computer, a method for generating a data stream, the method comprising:
entering first text into the data stream;
entering an escape-start-sequence into the data stream, the escape-start-sequence defining a first set of data units that are to be skipped by a base decoder but to be interpreted by an extension decoder,
entering the first set of data units into the data stream,
entering an escape-continuation-sequence into the data stream, the escape-continuation-sequence defining a second set of data units that are to be skipped by the base decoder but to be interpreted by the extension decoder together with the first set of data units;
entering the second set of data units into the data stream; and
entering second text following the second set of data units; wherein the escape-start-sequence includes an escape-start code signaling a beginning of the escape-start-sequence and a first length code identifying a first number of data units of the first set of data units, the escape-continuation-sequence includes a continuation code signaling a beginning of the escape-continuation-sequence and a second length code identifying a second number of data units of the second set of data units, the escape-start code is different from the continuation code, or, alternatively, the escape-start code and the continuation code are identical and the first length code includes a maximum length signal, when the first length code includes the maximum length signal, a code following the first length code including the maximum length signal in the data stream is the continuation code of the escape-continuation-sequence; and the first set of data units and the second set of data units are mutually exclusive.

* * * * *